US008223731B2

(12) United States Patent
Lee et al.

(10) Patent No.: US 8,223,731 B2
(45) Date of Patent: Jul. 17, 2012

(54) METHOD AND SYSTEM FOR AUTHENTICATION OF WLAN TERMINAL INTERWORKING WITH BROADBAND WIRELESS ACCESS NETWORK

(75) Inventors: Yong Lee, Seoul (KR); Wook Choi, Hwaseong-si (KR); Yong-Seok Park, Seongnam-si (KR); Hyo-Hyun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 12/073,356

(22) Filed: Mar. 4, 2008

(65) Prior Publication Data

US 2008/0219230 A1  Sep. 11, 2008

(30) Foreign Application Priority Data

Mar. 5, 2007  (KR) ................. 10-2007-0021483

(51) Int. Cl.
*H04W 4/00* (2009.01)
(52) U.S. Cl. ...................... 370/338; 370/331
(58) Field of Classification Search .............. 370/331, 370/338
See application file for complete search history.

(56) References Cited

U.S. PATENT DOCUMENTS

| 6,452,915 | B1 | 9/2002 | Jorgensen |
| 6,980,660 | B1* | 12/2005 | Hind et al. ............... 380/282 |
| 7,006,472 | B1 | 2/2006 | Immonen et al. |
| 7,317,708 | B2* | 1/2008 | Moon et al. .............. 370/331 |
| 7,440,757 | B2 | 10/2008 | Kwon et al. |
| 7,596,124 | B2* | 9/2009 | Brenes et al. ............. 370/338 |
| 2002/0075844 | A1 | 6/2002 | Hagen |
| 2004/0105413 | A1 | 6/2004 | Menon et al. |
| 2004/0203792 | A1 | 10/2004 | Shaheen et al. |
| 2005/0089052 | A1 | 4/2005 | Chen et al. |
| 2005/0192009 | A1 | 9/2005 | Shaheen et al. |
| 2006/0128362 | A1 | 6/2006 | Bae et al. |
| 2006/0274643 | A1* | 12/2006 | Choyi et al. ............... 370/216 |
| 2007/0021119 | A1* | 1/2007 | Lee et al. ................. 455/436 |
| 2007/0115899 | A1 | 5/2007 | Ovadia et al. |
| 2007/0140169 | A1 | 6/2007 | Rajagopalan |
| 2008/0095124 | A1 | 4/2008 | Ramos et al. |
| 2008/0101292 | A1 | 5/2008 | Sengupta et al. |

OTHER PUBLICATIONS

Office Action from the Korean Patent Office issued in Applicant's corresponding Korean Patent Application No. 2007-0021483 dated Mar. 25, 2008.
*Wireless Lan Security*, Cisco System, Inc., 2001.

(Continued)

*Primary Examiner* — Phuc Tran
(74) *Attorney, Agent, or Firm* — H.C. Park & Associates, PLC

(57) ABSTRACT

A method and a system for interworking with a Broadband Wireless Access (BWA) network in a Wireless Local Area Network (WLAN) terminal. According to the method, a relay station for connecting the Wireless Local Area Network (WLAN) terminal with the Broadband Wireless Access (BWA) network sets a connection with the Broadband Wireless Access (BWA) network through an initialization process. A user authentication with the Wireless Local Area Network (WLAN) terminal is performed by the relay station in compliance with a Wireless Local Area Network (WLAN) protocol. A user authentication with a Broadband Wireless Access (BWA) network Access Control Router (ACR) is performed in compliance with a Broadband Wireless Access (BWA) network protocol by the relay station in place of the Wireless Local Area Network (WLAN) terminal.

12 Claims, 7 Drawing Sheets

OTHER PUBLICATIONS

Transmittal Letter, along with a "Korean Decision of Grant" issued on May 26, 2009 in Applicant's corresponding Korean Patent Application No. 2007-0021483.

Final Office Action dated Mar. 1, 2011 for related U.S. Appl. No. 11/907,519.

Non-Final Office Action dated Sep. 16, 2010 for related U.S. Appl. No. 11/907,519.

IEEE Computer Society "802.1X-2004, IEEE Standard for Local and Metropolitan area networks Port-Based Network Access Control " Dec. 13, 2004 pp. 1-169 by IEEE New York, USA.

IEEE Computer Society and IEEE Microwave Theory and Techniques Society "802.16, IEEE Standard for Local and Metropolitan area networks Part 16: Air Interface for Fixed Broadband Wireless Access Systems" Oct. 1, 2004 pp. 1-857 by IEEE New York, USA.

IEEE Computer Society "802.11, IEEE Standard for Information technology-Telecommunications and information.exchange between systems-Local and metropolitan area networks-Specific Requirements Part 11: Wireless LAN Medium Access Control (MAC) and Physical Layer (PHY) Specifications" Jun. 12, 2007 pp. 1-724 by IEEE New York, USA.

IEEE Computer Society "802.11, IEEE Standard for Information technology—Telecommunications and information.exchange between systems—Local and metropolitan area networks—Specific Requirements Part 11: Wireless LAN Medium Access Control (MAC) and Physical Layer (PHY) Specifications, Annex A Protocol Implementation Conformance Statement (PICS) proforma " Jun. 12, 2007 pp. 725-1184 by IEEE New York, USA.

* cited by examiner

METHOD AND SYSTEM FOR AUTHENTICATION OF WLAN TERMINAL INTERWORKING WITH BROADBAND WIRELESS ACCESS NETWORK

CLAIM OF PRIORITY

This application makes reference to, incorporates the same herein, and claims all benefits accruing under 35 U.S.C. §119 from an application for METHOD AND SYSTEM FOR AUTHENTICATION OF WLAN TERMINAL INTER WORKING WITH BROADBAND WIRELESS ACCESS NETWORK earlier filed in the Korean Intellectual Property Office on 5 Mar. 2007 and there duly assigned Serial No. 10-2007-0021483.

BACKGROUND OF THE INVENTION

1. Field of the Invention

The present invention relates to a method and a system for authenticating a Wireless Local Area Network (WLAN) terminal interworking with a Broadband Wireless Access (BWA) network.

2. Description of the Related Art

With the evolution of the technology in wireless data communication, wireless networks such as Institute of Electrical and Electronics Engineers (IEEE) 802.11a/b/g, 3rd-Generation (3G) High Speed Downlink Packet Access (HSDPA), Worldwide Interoperability for Microwave Access (Worldwide Interoperability for Microwave Access (WiMAX)), and Wireless Broadband (WiBro) using heterogeneous wireless technologies are configured, offering users a huge array of choices in wireless data service.

The usage of Wireless Local Area Network (WLAN) environments using unlicensed bandwidths is increasing, though not providing mobility, owing to relative advantages of several aspects such as connection costs.

Universal Mobile Telecommunication System-Wireless Local Area Network (UMTS-WLAN) interworking wireless routers for providing connectivity to Wireless Fidelity (WiFi) users in 3G networks have been already employed. In general, wireless routers supporting unlicensed bandwidth users under Internet Protocol version 4 (IPv4) environments all use a Network Address Translation (NAT) technology.

Network Address Translation (NAT) is a technology for sharing one or more public IP addresses among several users in consideration of a shortage of IP addresses such that the users can connect to a public network using one public IP address. That is, each of several Wireless Fidelity (WiFi) users is allocated one private IP address, and the Wireless Fidelity (WiFi) users may share one public IP address that is given to a router and connect to an Internet network.

To allow a plurality of users to share one public IP address, even translation for port information on Transmission Control Protocol (TCP)/User Datagram Protocol (UDP) should be performed. This is called IP masquerading in LINUX environments.

SUMMARY OF THE INVENTION

It is therefore an object of the present invention to provide an improved method and an improved system for interworking a Wireless Local Area Network (WLAN) terminal with a Broadband Wireless Access (BWA) network.

It is another object of the present invention to solve the foregoing problems of the prior art.

It is still another object of the present invention to provide Internet connection to the Wireless Local Area Network (WLAN) terminal under Wireless Broadband (WiBro), Worldwide Interoperability for Microwave Access (WiMAX)-based Broadband Wireless Access (BWA) environments.

It is a further object of the present invention to provide a method and a system for user authentication upon interworking.

According to an aspect of the invention for realizing the above objects, a method for interworking with a Broadband Wireless Access (BWA) network in a Wireless Local Area Network (WLAN) terminal is provided. According to the method, a relay station for connecting the Wireless Local Area Network (WLAN) terminal with the Broadband Wireless Access (BWA) network sets a connection with the Broadband Wireless Access (BWA) network through an initialization process. A user authentication with the Wireless Local Area Network (WLAN) terminal is performed by the relay station in compliance with a Wireless Local Area Network (WLAN) protocol. A user authentication with a Broadband Wireless Access (BWA) network Access Control Router (ACR) is performed in compliance with a Broadband Wireless Access (BWA) network protocol by the relay station in place of the Wireless Local Area Network (WLAN) terminal.

The step of performing, by the relay station, the user authentication in compliance with the Wireless Local Area Network (WLAN) protocol may include receiving an association message including a Media Access Control (MAC) address from the Wireless Local Area Network (WLAN) terminal, and performing an IEEE 802.11i user authentication in compliance with the Wireless Local Area Network (WLAN) protocol by using the association message.

The step of performing, by the relay station, the user authentication with the Broadband Wireless Access (BWA) network Access Control Router (ACR) may include sending a Wireless Local Area Network (WLAN) address of the Wireless Local Area Network (WLAN) terminal included in the association message to the Broadband Wireless Access (BWA) network Access Control Router (ACR), and after the Broadband Wireless Access (BWA) network Access Control Router (ACR) performs the user authentication, receiving a public key created using the Wireless Local Area Network (WLAN) address and relaying the public key to the Wireless Local Area Network (WLAN) terminal.

The relay station may send a result of an exclusive OR operation between a Media Access Control (MAC) address of the Wireless Local Area Network (WLAN) terminal included in the association message and a Transport IDentifier (TID) to the Broadband Wireless Access (BWA) network Access Control Router (ACR). A key to be shared by the Broadband Wireless Access (BWA) network Access Control Router (ACR) and the Wireless Local Area Network (WLAN) terminal may be created by using the result value of the exclusive OR operation with the Media Access Control (MAC) address of the Wireless Local Area Network (WLAN) terminal, Primary Master Key (PMK), a Media Access Control (MAC) address of an authentication server, and a random number.

The method may further include sending, by the Wireless Local Area Network (WLAN) terminal, an IP address allocation request to the relay station and relaying, by the relay station, the IP address allocation request to the Broadband Wireless Access (BWA) network Radio Access Station (RAS); sending, by the Broadband Wireless Access (BWA) network Radio Access Station (RAS), a notification of a Connection IDentification (CID) corresponding to a Quality of Service (QoS) level of the Wireless Local Area Network (WLAN) terminal to the relay station; and mapping and storing, by the relay station, the Connection IDentification (CID) and the Media Access Control (MAC) address of the Wireless Local Area Network (WLAN) terminal and then forwarding the Connection IDentification (CID) to the Wireless Local Area Network (WLAN) terminal.

According to another aspect of the invention for realizing the above objects, a relay station of interworking between a Broadband Wireless Access (BWA) network and a Wireless Local Area Network (WLAN) network is provided. The relay station is constructed with a Broadband Wireless Access (BWA) connection manager, an Unlicensed Mobile Access (UMA) connection manager, and a Broadband Wireless Access (BWA)-Unlicensed Mobile Access (UMA) setup manager. The Broadband Wireless Access (BWA) connection manager interworks with the Broadband Wireless Access (BWA) network and performs a Broadband Wireless Access (BWA) network initialization process. The Unlicensed Mobile Access (UMA) connection manager interworks with the Wireless Local Area Network (WLAN) terminal and performs a user authentication of the Wireless Local Area Network (WLAN) terminal connected in compliance with a Wireless Local Area Network (WLAN) protocol. The Broadband Wireless Access (BWA)-Unlicensed Mobile Access (UMA) setup manager interworks between the Broadband Wireless Access (BWA) connection manager and the Unlicensed Mobile Access (UMA) connection manager and sends a request for authenticating the Wireless Local Area Network (WLAN) terminal to the Broadband Wireless Access (BWA) network.

The Unlicensed Mobile Access (UMA) connection manager may receive an association message including a Media Access Control (MAC) address from the Wireless Local Area Network (WLAN) terminal and perform an IEEE 802.11i user authentication in compliance with the Wireless Local Area Network (WLAN) protocol by using the association message.

The Broadband Wireless Access (BWA)-Unlicensed Mobile Access (UMA) setup manager may forward an access request message, which includes the Media Access Control (MAC) address of the Wireless Local Area Network (WLAN) terminal included in the association message, to the Broadband Wireless Access (BWA) connection manager. The Broadband Wireless Access (BWA)-Unlicensed Mobile Access (UMA) setup manager may send an access request message to the Broadband Wireless Access (BWA) connection manager. The access request message includes a result of an exclusive OR operation between the Media Access Control (MAC) address of the Wireless Local Area Network (WLAN) terminal included in the association message and a Transport IDentifier (TID).

After receiving the access request message from the Broadband Wireless Access (BWA)-Unlicensed Mobile Access (UMA) setup manager, the Broadband Wireless Access (BWA) connection manager may perform a user authentication for the Broadband Wireless Access (BWA) network in place of the Wireless Local Area Network (WLAN) terminal and relays a public key, which is created by using the Media Access Control (MAC) address of the Wireless Local Area Network (WLAN) terminal, to the Wireless Local Area Network (WLAN) terminal.

According to a further another aspect of the invention for realizing the above objects a Universal Mobile Telecommunication System-Wireless Local Area Network (UMTS-WLAN) interworking network is provided. The interworking network may be constructed with a Wireless Local Area Network (WLAN) terminal, a relay station, a Broadband Wireless Access (BWA) network Radio Access Station (RAS), and a Broadband Wireless Access (BWA) network Access Control Router (ACR). The Wireless Local Area Network (WLAN) terminal provides a data service by using a Wireless Local Area Network (WLAN) network or a Broadband Wireless Access (BWA) network to a user. The relay station performs a user authentication with the Wireless Local Area Network (WLAN) terminal in compliance with a Wireless Local Area Network (WLAN) protocol and performs a user authentication with a Broadband Wireless Access (BWA) network Access Control Router (ACR) in compliance with a Broadband Wireless Access (BWA) network protocol in place of the Wireless Local Area Network (WLAN) terminal. If there is a connection request of the Wireless Local Area Network (WLAN) terminal, the Broadband Wireless Access (BWA) network Radio Access Station (RAS) allocates a dedicated Connection IDentification (CID) number for the Wireless Local Area Network (WLAN) terminal in response to a request of the relay station and forwards data from the Broadband Wireless Access (BWA) network to the Wireless Local Area Network (WLAN) terminal. The Broadband Wireless Access (BWA) network Access Control Router (ACR) allocates a public IP address for the relay station in response to a request of the relay station during the execution of a Broadband Wireless Access (BWA) network initialization process and performs a user authentication of the Wireless Local Area Network (WLAN) terminal in response to a request from the relay station.

The relay station may receive an association message including a Media Access Control (MAC) address from the Wireless Local Area Network (WLAN) terminal and perform an IEEE 802.11i user authentication in compliance with the Wireless Local Area Network (WLAN) protocol by using the association message. The relay station may transmit the Media Access Control (MAC) address of the Wireless Local Area Network (WLAN) terminal included in the association message to the Broadband Wireless Access (BWA) network Access Control Router (ACR). After performing the user authentication of the Wireless Local Area Network (WLAN) terminal, the Broadband Wireless Access (BWA) network Access Control Router (ACR) may create a public key using the Media Access Control (MAC) address of the Wireless Local Area Network (WLAN) terminal and forward the public key to the relay station.

The relay station may transmit a result of an exclusive OR operation between the Media Access Control (MAC) address of the Wireless Local Area Network (WLAN) terminal included in the association message and a Transport IDentifier (TID) to the Broadband Wireless Access (BWA) network Access Control Router (ACR).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention will now be described more fully hereinafter with reference to the accompanying drawings, in which preferred embodiments of a method and system for user authentication of a Wireless Local Area Network (WLAN) terminal interworking with a Broadband Wireless Access (BWA) network.

Figure 1:
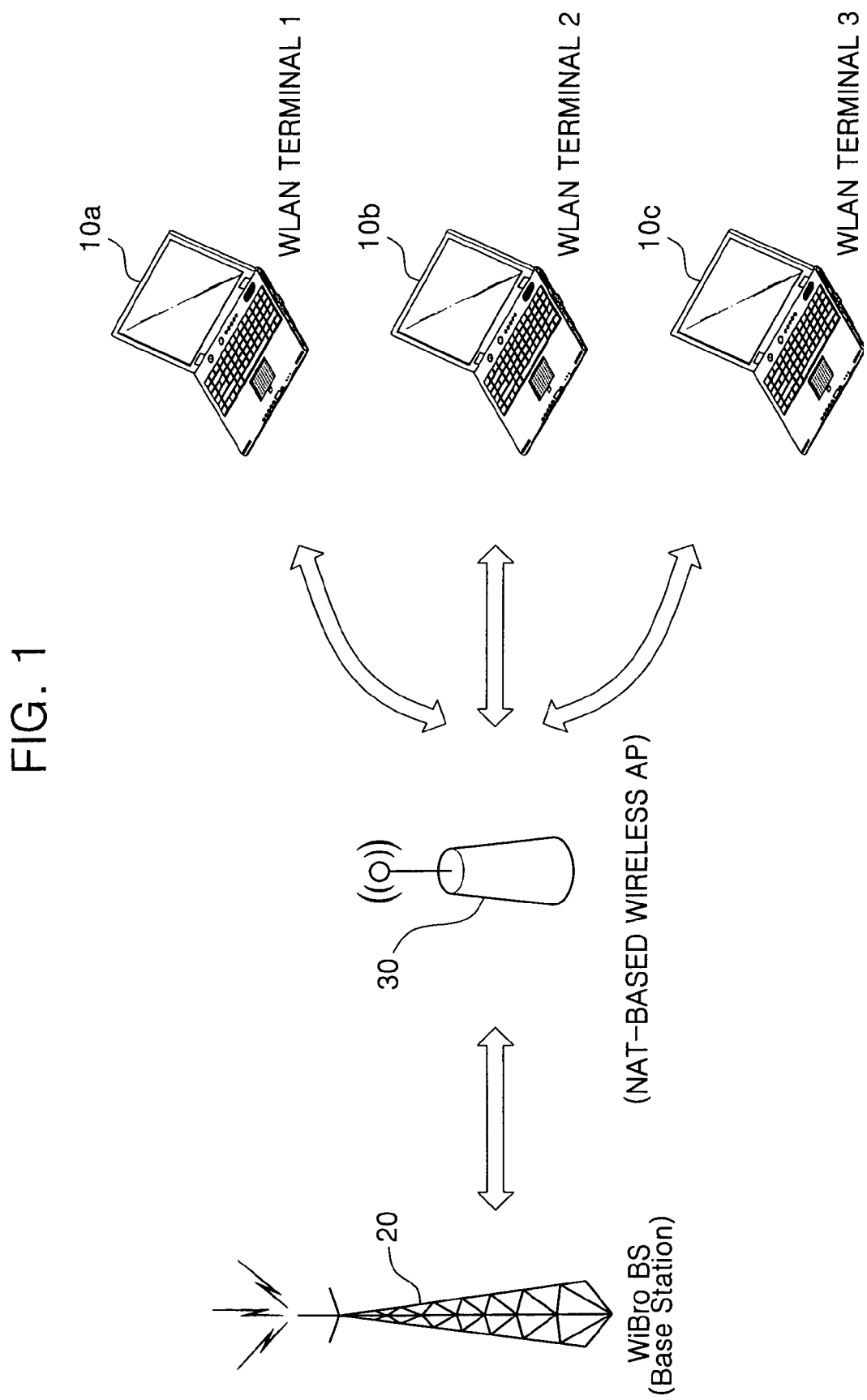
FIG. 1 is an exemplary diagram illustrating a method for interworking between a Wireless Local Area Network (WLAN) network and a Wireless Broadband (WiBro) network using an Network Address Translation (NAT)-based wireless Access Point (AP)

FIG. 1 is an exemplary diagram illustrating a method for interworking between a Wireless Local Area Network (WLAN) network and a Wireless Broadband (WiBro) network using a Network Address Translation (NAT)-based wireless Access Point (AP).

As shown in FIG. 1, a plurality of Wireless Local Area Network (WLAN) terminals 10a, 10b, and 10c can be provided with Internet services through Network Address Translation (NAT)-based wireless Access Point (AP) 30. Network Address Translation (NAT)-based wireless Access Point (AP) 30 performs a wireless communication with a Wireless Broadband (WiBro) Base Station (BS) 20.

Network Address Translation (NAT)-based wireless Access Point (AP) 30 has an Network Address Translation (NAT) function of translating private IP addresses of Wireless Local Area Network (WLAN) terminals 10a, 10b, and 10c into one public IP address and connecting Wireless Local Area Network (WLAN) terminals 10a, 10b, and 10c to a public IP network (e.g., the Internet) by using the public IP address.

As described above, in the interworking method of FIG. 1, several Wireless Local Area Network (WLAN) users basically allocated private IP addresses can access a public IP network such as the Internet by using one public IP address. The public IP network cannot, however, obtain personal information on the Wireless Local Area Network (WLAN) users. That is, there is a drawback that it is difficult to manage the Wireless Local Area Network (WLAN) users because the Wireless Local Area Network (WLAN) users using the private IP addresses are invisible to the public IP network.

Figure 2:
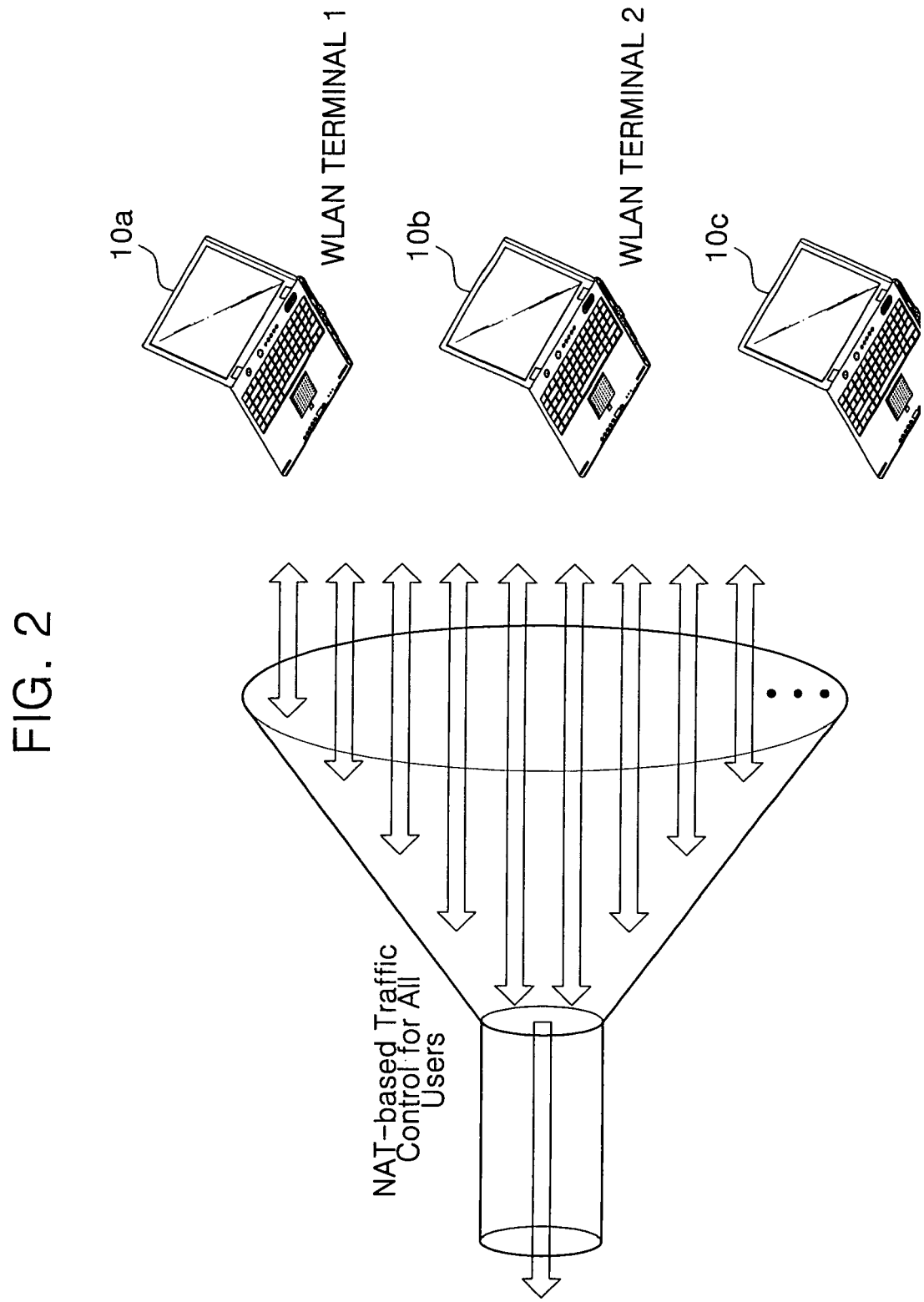
FIG. 2 is an exemplary diagram illustrating a traffic flow according to the interworking method of FIG. 1.

FIG. 2 is an exemplary diagram illustrating a traffic flow according to the interworking method of FIG. 1.

In FIG. 2, each of Wireless Local Area Network (WLAN) terminals 10a, 10b, and 10c transmits data to Network Address Translation (NAT)-based wireless Access Point (AP) 30 to use a variety of user applications. In this case, the public IP network has no choice but to determine that data transmission is performed only at Network Address Translation (NAT)-based wireless Access Point (AP) 30, because Network Address Translation (NAT)-based wireless Access Point (AP) 30 translates the addresses of Wireless Local Area Network (WLAN) terminals 10a, 10b, and 10c from which the packets are forwarded over the Internet, into a public IP address allocated to the Network Address Translation (NAT)-based wireless Access Point (AP) 30 itself, and also performs a port translation process.

Finally, in the event that Network Address Translation (NAT) translation is performed, it is impossible to identify users in the public IP network. Also, because even a Transmission Control Protocol (TCP)/User Datagram Protocol (UDP) port is translated on a per-service basis, it is impossible to identify users using the port. Such a traffic flow is shown in FIG. 2.

In addition to the drawback that user identification is impossible, security schemes provided to the respective networks are different from each other. In cases where users are offered access between heterogeneous networks, there is a drawback that it is difficult to identify and authenticate a user originating from a different network.

In a Wireless Broadband (WiBro), which is a Worldwide Interoperability for Microwave Access (WiMAX)-based Broadband Wireless Access (BWA) environment, a Private Key Management (PKM)-based authentication protocol is used for user authentication. In a Wireless Local Area Network (WLAN) environment, IEEE 802.1X and 802.11i authentication protocols are used for user authentication. Thus, an attempt to find a method for, when a Wireless Local Area Network (WLAN) network user attempts to access a Broadband Wireless Access (BWA) network environment, performing user authentication in each network has to be made.

Figure 3:
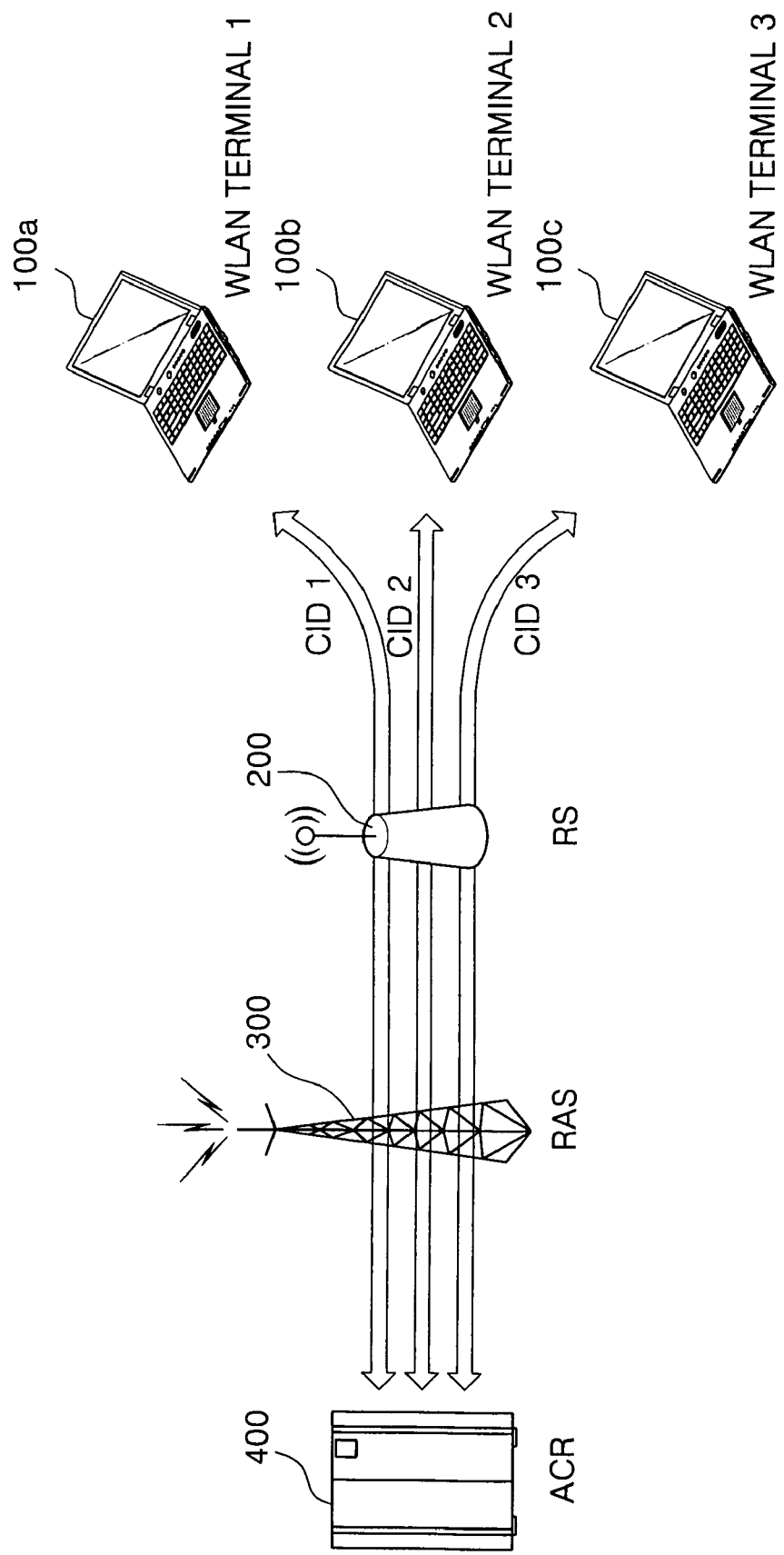
FIG. 3 is an exemplary diagram illustrating a method for interworking between a Wireless Local Area Network (WLAN) network and a Wireless Broadband (WiBro) network according to an exemplary embodiment of the principles of the present invention.

FIG. 3 is an exemplary diagram illustrating a method for interworking between a Wireless Local Area Network (WLAN) network and a Wireless Broadband (WiBro) network according to an exemplary embodiment of the principles of the present invention.

As shown in FIG. 3, an Universal Mobile Telecommunication System-Wireless Local Area Network (UMTS-WLAN) interworking network can include a plurality of Wireless Local Area Network (WLAN) terminals 100a, 100b, and 100c, a Relay Station (RS) 200, a Wireless Broadband (WiBro) Radio Access Station (RAS) 300, and a Wireless Broadband (WiBro) Access Control Router (ACR) 400.

Each of Wireless Local Area Network (WLAN) terminals 100a, 100b, and 100c using unlicensed bandwidths is offered Internet service through Relay Station (RS) 200. Access using the unlicensed bandwidth is called an Unlicensed Mobile Access (UMA).

Wireless Broadband (WiBro) Radio Access Station (RAS) 300 is an element for providing Internet services even to Wireless Local Area Network (WLAN) terminal 100 via Relay Station (RS) 200. If there is an Unlicensed Mobile Access (UMA) connection request from Wireless Local Area Network (WLAN) terminal 100, Wireless Broadband (WiBro) Radio Access Station (RAS) 300 receives a request for allocating a dedicated Connection IDentification (CID) number for Wireless Local Area Network (WLAN) terminal 100 from Relay Station (RS) 200, and allocates the dedicated Connection IDentification (CID) number for Wireless Local Area Network (WLAN) terminal 100. Then, Wireless Broadband (WiBro) Radio Access Station (RAS) 300 can distinguish Wireless Local Area Network (WLAN) terminals 100 performing Unlicensed Mobile Access (UMA) connection, using such Connection IDentifications (CIDs).

Wireless Broadband (WiBro) Access Control Router (ACR) 400 manages a plurality of Radio Access Stations (RASs) 300 within the Wireless Broadband (WiBro) network. In particular, in the exemplary embodiment of the present invention, Wireless Broadband (WiBro) Access Control Router (ACR) 400 allocates a public IP address for Relay Station (RS) 200 in response to a request of Relay Station (RS) 200 during the execution of a Wireless Broadband (WiBro) initialization process.

Wireless Broadband (WiBro) Access Control Router (ACR) 400 performs authentication of Wireless Local Area Network (WLAN) terminal 100 in response to a request from Relay Station (RS) 200 complying with an Unlicensed Mobile Access (UMA) connection request from Wireless Local Area Network (WLAN) terminal 100. An authentication method used in this case can be a Private Key Management (PKM)-based authentication protocol used in Wireless Broadband (WiBro).

Relay Station (RS) 200 connects the plurality of Wireless Local Area Network (WLAN) terminals 100 using the unlicensed bandwidths with an IEEE 802.16 Wireless Broadband (WiBro)/Worldwide Interoperability for Microwave Access (WiMAX) network. Construction and operation of Relay Station (RS) 200 is described in more detail below with reference to FIG. 5.

Figure 4:
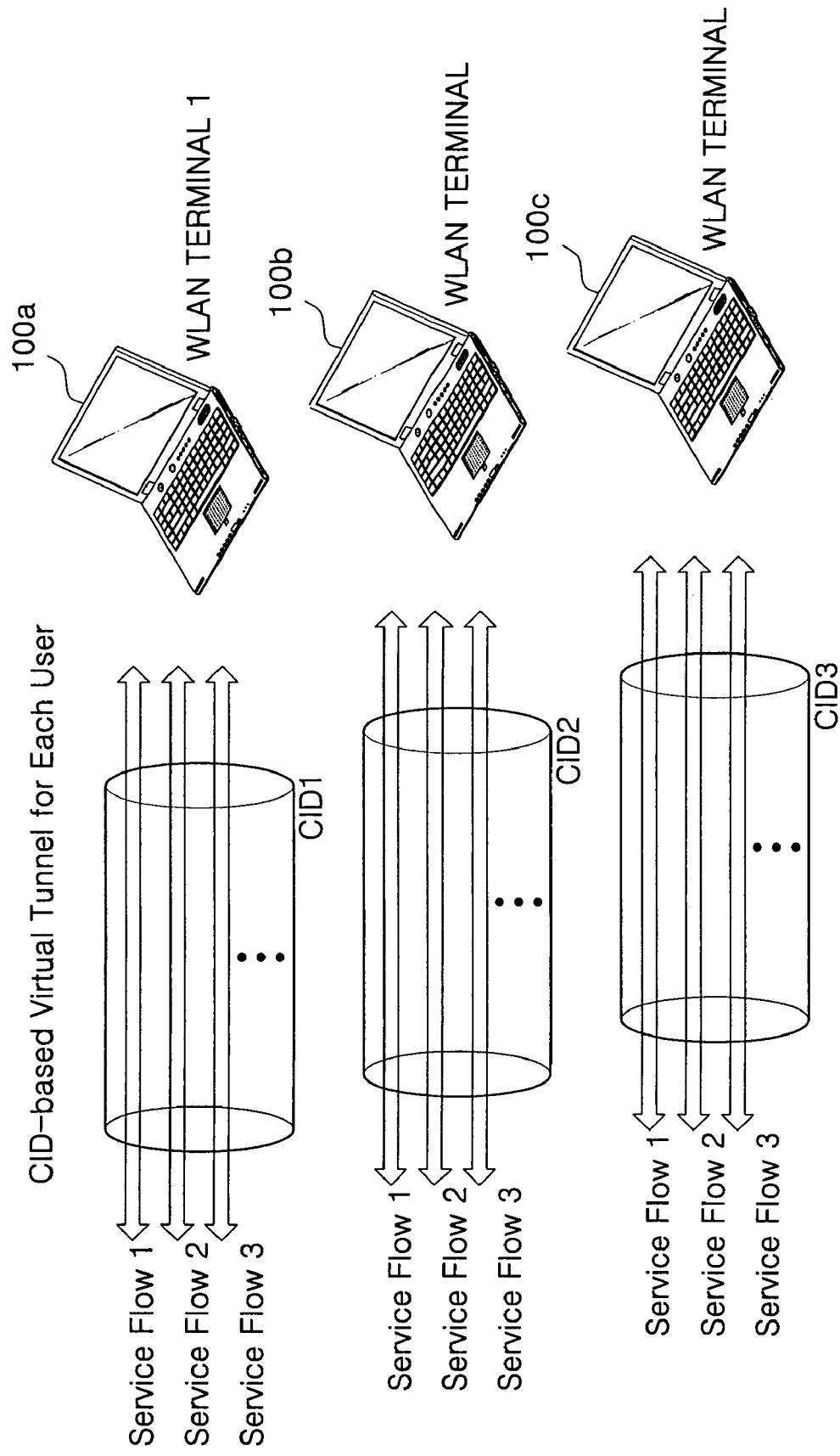
FIG. 4 is an exemplary diagram illustrating a traffic flow according to the interworking method of FIG. 3.

FIG. 4 is an exemplary diagram illustrating a traffic flow according to the interworking method of FIG. 3.

In the interworking method of FIG. 3, each of Wireless Local Area Network (WLAN) terminals 100 can send and receive a diversity of traffic service flows (service flow 1, service flow 2, and service flow 3) on a user application, by using a Connection IDentification (CID)-based virtual tunnel (CID 1, CID 2, or CID 3).

As shown in FIG. 4, the public IP network can distinguish packets, which are transmitted by Wireless Local Area Network (WLAN) terminal 100, using the Connection IDentification (CID). Thus, Wireless Broadband (WiBro) Access Control Router (ACR) 400 can separately manage Wireless Local Area Network (WLAN) terminals 100a~100c, that exist at a lower level of Relay Station (RS) 200, using the Connection IDentifications (CIDs) respectively corresponding to Wireless Local Area Network (WLAN) terminals 100a~100c. In other words, Wireless Broadband (WiBro) Access Control Router (ACR) 400 can perform authentication of Wireless Local Area Network (WLAN) terminal 100 or bill a service, individually.

Figure 5:
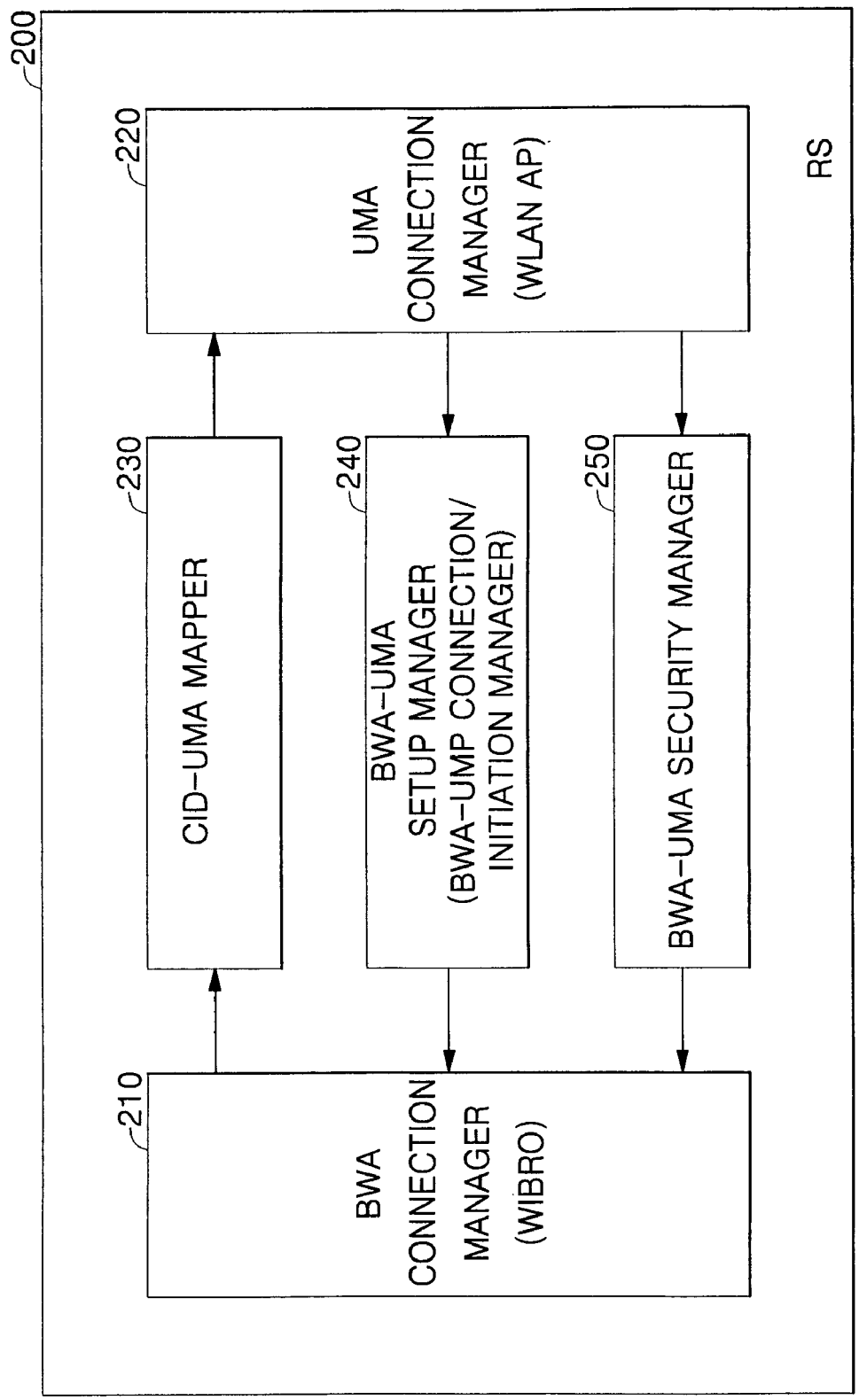
FIG. 5 is a block diagram illustrating construction of a relay station according to an exemplary embodiment of the principles of the present invention.

FIG. 5 is a block diagram illustrating the construction of the Relay Station (RS) according to an exemplary embodiment of the principles of the present invention.

In FIG. 5, Relay Station (RS) 200 can be constructed with a Broadband Wireless Access (BWA) connection manager 210, an Unlicensed Mobile Access (UMA) connection manager 220, a Connection IDentification (CID)-Unlicensed Mobile Access (UMA) mapper 230, a Broadband Wireless Access (BWA)-Unlicensed Mobile Access (UMA) setup manager 240, and a Broadband Wireless Access (BWA)-Unlicensed Mobile Access (UMA) security manager 250.

Broadband Wireless Access (BWA) connection manager 210 is an element for interfacing with Wireless Broadband (WiBro) Radio Access Station (RAS) 300 or Wireless Broadband (WiBro) Access Control Router (ACR) 400 such that Wireless Local Area Network (WLAN) terminal 100 can be provided with data service through the Wireless Broadband (WiBro) network. For example, Broadband Wireless Access (BWA) connection manager 210 performs a Wireless Broadband (WiBro) initialization process for data exchange between Relay Station (RS) 200 and Wireless Broadband (WiBro) Access Control Router (ACR) 400. The Wireless Broadband (WiBro) initialization includes detailed processes such as ranging, Subscriber Station (SS) Basic Capability (SBC) negotiation, authentication, registration, and service addition.

Inversely, Unlicensed Mobile Access (UMA) connection manager 220 is an interface for exchanging data with Wireless Local Area Network (WLAN) terminal 100 in compliance with a Wireless Local Area Network (WLAN) protocol. Namely, Unlicensed Mobile Access (UMA) connection manager 220 is a device that is in charge of the role of a Wireless Local Area Network (WLAN) Access Point (AP). Alternatively, unlike FIG. 5 showing that Unlicensed Mobile Access (UMA) connection manager 220 is included in Relay Station (RS) 200, Unlicensed Mobile Access (UMA) connection manager 220 can be configured as the Wireless Local Area Network (WLAN) Access Point (AP) independently from Relay Station (RS) 200.

After the Wireless Broadband (WiBro) initialization of Relay Station (RS) 200 ends, Unlicensed Mobile Access (UMA) connection manager 220 receives an association request message for requesting Wireless Broadband (WiBro) network connection from Wireless Local Area Network (WLAN) terminal 100. The association request message includes user information such as a Media Access Control (MAC) address of Wireless Local Area Network (WLAN) terminal 100.

When Unlicensed Mobile Access (UMA) connection manager 220 receives the association request message from Wireless Local Area Network (WLAN) terminal 100, Unlicensed Mobile Access (UMA) connection manager 220 forwards an access request message to Broadband Wireless Access (BWA)-Unlicensed Mobile Access (UMA) setup manager 240.

Broadband Wireless Access (BWA)-Unlicensed Mobile Access (UMA) setup manager 240, interworks with Broadband Wireless Access (BWA) connection manager 210 and Unlicensed Mobile Access (UMA) connection manager 220, and sends a request for authentication of Wireless Local Area Network (WLAN) terminal 100 to the Wireless Broadband (WiBro) network.

Broadband Wireless Access (BWA)-Unlicensed Mobile Access (UMA) setup manager 240 sends the user authentication request message including the user information (e.g., Media Access Control (MAC) address) to the Wireless Broadband (WiBro) network via Broadband Wireless Access (BWA) connection manager 210, attempting a request for user authentication. If the user authentication is successful, Broadband Wireless Access (BWA)-Unlicensed Mobile Access (UMA) setup manager 240 receives a response message from the Wireless Broadband (WiBro) network and notifies Wireless Local Area Network (WLAN) terminal 100 of the reception.

Broadband Wireless Access (BWA)-Unlicensed Mobile Access (UMA) setup manager 240 can include a BandWidth (BW) negotiator (not shown) and a Quality of Service (QoS) controller (not shown). The BandWidth (BW) negotiator is used for bandwidth negotiation when IP packets are sent and received. Broadband Wireless Access (BWA)-Unlicensed Mobile Access (UMA) setup manager 240 can be realized even by a component of a Broadband Wireless Access (BWA) core network for better efficiency.

At the time Broadband Wireless Access (BWA)-Unlicensed Mobile Access (UMA) interworking is implemented by Broadband Wireless Access (BWA)-Unlicensed Mobile Access (UMA) setup manager 240, Connection IDentification (CID)-Unlicensed Mobile Access (UMA) mapper 230 performs mapping between a virtual Connection IDentification (CID), which is allocated to each Wireless Local Area Network (WLAN) terminal 100 by Wireless Broadband (WiBro) Radio Access Station (RAS) 300, and the corresponding Wireless Local Area Network (WLAN) terminal 100. Connection IDentification (CID)-Unlicensed Mobile Access (UMA) mapper 230 can also map a plurality of different Connection IDentification (CID) number groups to one Unlicensed Mobile Access (UMA).

Particularly, in the case of an Internet Protocol version 4 (IPv4) network using a private address, Connection IDentification (CID)-Unlicensed Mobile Access (UMA) mapper 230 is in charge of port mapping for enabling several service flows of one user to a dedicated virtual link Connection IDentification (CID).

Broadband Wireless Access (BWA)-Unlicensed Mobile Access (UMA) security manager 250 manages a key shared by Wireless Broadband (WiBro) Access Control Router (ACR) 400 and Wireless Local Area Network (WLAN) terminal 100. Relay Station (RS) 200 manages the plurality of Wireless Local Area Network (WLAN) terminals 100 connecting to the Wireless Broadband (WiBro) network.

In detail, Broadband Wireless Access (BWA)-Unlicensed Mobile Access (UMA) security manager 250 manages the respective keys of Wireless Local Area Network (WLAN) terminals 100, by using Media Access Control (MAC) addresses of the corresponding Wireless Local Area Network (WLAN) terminals 100 or respective results of eXclusive OR (XOR) operations between the Media Access Control (MAC) addresses and Transport IDentifiers (TIDs). Relay Station (RS) 200 can perform an authentication process in compliance with an IEEE 802.16 protocol in place of Wireless Local Area Network (WLAN) terminal 100, using the key managed at each Wireless Local Area Network (WLAN) terminal 100.

Figure 6:
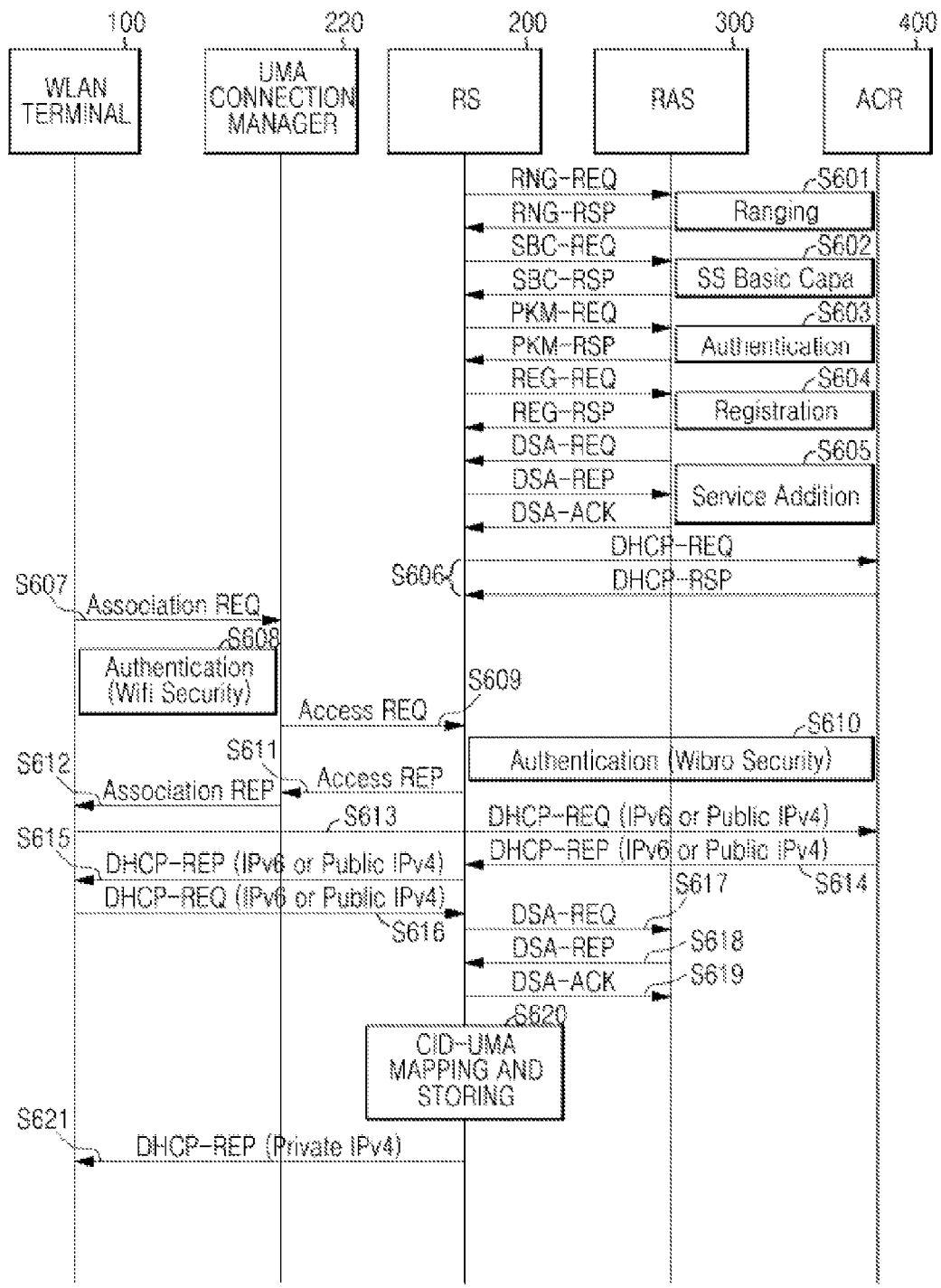
FIG. 6 is a ladder diagram illustrating a method for interworking between a Wireless Local Area Network (WLAN) network and an IEEE 802.16 network according to another exemplary embodiment of the principles of the present invention.

FIG. 6 is a ladder diagram illustrating a method for interworking between a Wireless Local Area Network (WLAN) network and an IEEE 802.16 network according to another exemplary embodiment of the principles of the present invention.

First, a Relay Station (RS) 200 performs a connection setup with a Wireless Broadband (WiBro) core network and obtains basic, primary and secondary IDs for Media Access Control (MAC) management message transmission, a Transport IDentifier (TID) for data transmission, and a public IP address (steps 601 to 606).

This is described in more detail. A ranging process of exchanging a ranging request message (RNG-REQ) and a ranging response message (RNG-RSP) between Relay Station (RS) 200 and a Wireless Broadband (WiBro) Radio Access Station (RAS) 300 is performed (step 601). After that, a Subscriber Station (SS) Basic Capability (SBC) process of exchanging a SBC request message (SBC-REQ) and a SBC response message (SBC-RSP) is performed (step 602). Next, Relay Station (RS) 200 and Wireless Broadband (WiBro) Radio Access Station (RAS) 300 perform an authentication process by using a Private Key Management request message (PKM-REQ) and a Private Key Management response message (PKM-RSP) (step 603), and then perform a registration process by using a registration request message (REG-REQ) and a registration response message (REG-RSP) (step 604). After that, Relay Station (RS) 200 performs a service addition process using a Dynamic Service Addition (DSA) request message (DSA-REQ), a Dynamic Service Addition (DSA) reply message (DSA-REP), and a Dynamic Service Addition (DSA) acknowledgment message (DSA-ACK) (step 605). Finally, Relay Station (RS) 200 performs a Dynamic Host Configuration Protocol (DHCP) setup process for its own public IP address allocation (step 606).

After completing a preparing process (i.e., connection setup process) with the Wireless Broadband (WiBro) core network as described above, Relay Station (RS) 200 waits an Unlicensed Mobile Access (UMA) request from Wireless Local Area Network (WLAN) terminal 100.

Wireless Local Area Network (WLAN) terminal 100 sends an association request message (Association REQ) to Relay Station (RS) 200 to access the Wireless Broadband (WiBro) network (step 607). Unlicensed Mobile Access (UMA) connection manager 220 located within Relay Station (RS) 200 receives the association request. If the association is done, Unlicensed Mobile Access (UMA) connection manager 220 of Relay Station (RS) 200 performs authentication (Wireless Fidelity (WiFi) security) of Wireless Local Area Network (WLAN) terminal 100 by requesting access in compliance with a Wireless Fidelity (WiFi) authentication protocol (step 608). Specifically, Unlicensed Mobile Access (UMA) connection manager 220 of Relay Station (RS) 200 performs an IEEE 802.11i user authentication in compliance with a Wireless Local Area Network (WLAN) protocol.

If the user authentication of step 608 is successful, Unlicensed Mobile Access (UMA) connection manager 220 sends an access request message (Access REQ) to Broadband Wireless Access (BWA) connection manager 210 of Relay Station (RS) 200 as reserving a key distribution process that is one of authentication execution processes (step 609).

The access request message includes user information that is a combination of a Transport IDentifier (TID) allocated during the Wireless Broadband (WiBro) initialization, together with user information such as a Media Access Control (MAC) address of the associated Wireless Local Area Network (WLAN) terminal 100. Relay Station (RS) 200 performs authentication (Wireless Broadband (WiBro) security) for Wireless Broadband (WiBro) Access Control Router (ACR) 400 in place of Wireless Local Area Network (WLAN) terminal 100, by using the user information (step 610).

As a result of the user authentication process, Relay Station (RS) 200 obtains a shared key from Wireless Broadband (WiBro) Access Control Router (ACR) 400. Relay Station (RS) 200 forwards the obtained shared key to Wireless Local Area Network (WLAN) terminal 100 via Unlicensed Mobile Access (UMA) connection manager 200. Thus, Wireless Local Area Network (WLAN) terminal 100 and Wireless Broadband (WiBro) Access Control Router (ACR) 400 share the key.

If the above process is successful, Broadband Wireless Access (BWA) connection manager 210 of Relay Station (RS) 200 forwards an access response message (Access REP) to Unlicensed Mobile Access (UMA) connection manager 220 (step 611). Then, Unlicensed Mobile Access (UMA) connection manager 220 forwards an association response message (Association REP) to Wireless Local Area Network (WLAN) terminal 100 (step 612).

After the above authentication process is finished, Wireless Local Area Network (WLAN) terminal 100 sends a Dynamic Host Configuration Protocol (DHCP) request message (DHCP-REQ) to Wireless Broadband (WiBro) Access Control Router (ACR) 400, requesting for allocating an Internet Protocol version 6 (IPv6) address or a public Internet Protocol version 4 (IPv4) address (step 613). In response to the request of Wireless Local Area Network (WLAN) terminal 100, Wireless Broadband (WiBro) Access Control Router (ACR) 400 allocates the Internet Protocol version 6 (IPv6) or public Internet Protocol version 4 (IPv4) address, and forwards a Dynamic Host Configuration Protocol (DHCP) reply message (DHCP-REP) including allocated IP address information to Relay Station (RS) 200 (step 614). Then, Relay Station (RS) 200 performs a relay process of sending the Internet Protocol version 6 (IPv6) address or public Internet Protocol version 4 (IPv4) address in the form of a Dynamic Host Configuration Protocol (DHCP) reply message (DHCP-REP) to Wireless Local Area Network (WLAN) terminal 100 (step 615).

Alternatively, if Wireless Local Area Network (WLAN) terminal 100 employs an Network Address Translation (NAT) function by using a private IP address, Wireless Local Area Network (WLAN) terminal 100 performs a Dynamic Host Configuration Protocol (DHCP) setup process different from steps 613 to 615. First, Wireless Local Area Network (WLAN) terminal 100 sends a request for a private Internet Protocol version 4 (IPv4) address to be used by itself to Relay Station (RS) 200 (step 616). Then, Relay Station (RS) 200 sends a Dynamic Service Addition (DSA) request message (DSA-REQ) to Wireless Broadband (WiBro) Radio Access Station (RAS) 300, requesting for a Connection IDentification (CID) corresponding to a Quality of Service (QoS) level and a private Internet Protocol version 4 (IPv4) address of Wireless Local Area Network (WLAN) terminal 100 (step 617).

Relay Station (RS) 200 can be aware of the Connection IDentification (CID) and the private Internet Protocol version 4 (IPv4) address given to Wireless Local Area Network (WLAN) terminal 100 through step 618 of sending a Dynamic Service Addition (DSA) reply message (DSA-REP) and step 619 of sending a Dynamic Service Addition (DSA) Acknowledgment message (DSA-ACK). After that, Relay Station (RS) 200 maps and stores the Connection IDentification (CID) and the private IP address of Wireless Local Area Network (WLAN) terminal 100 (step 620).

Next, Relay Station (RS) 200 forwards a Dynamic Host Configuration Protocol (DHCP) reply message (DHCP-REP) to Wireless Local Area Network (WLAN) terminal 100, notifying the private Internet Protocol version 4 (IPv4) address to be used by Wireless Local Area Network (WLAN) terminal 100 (step 621).

Figure 7:
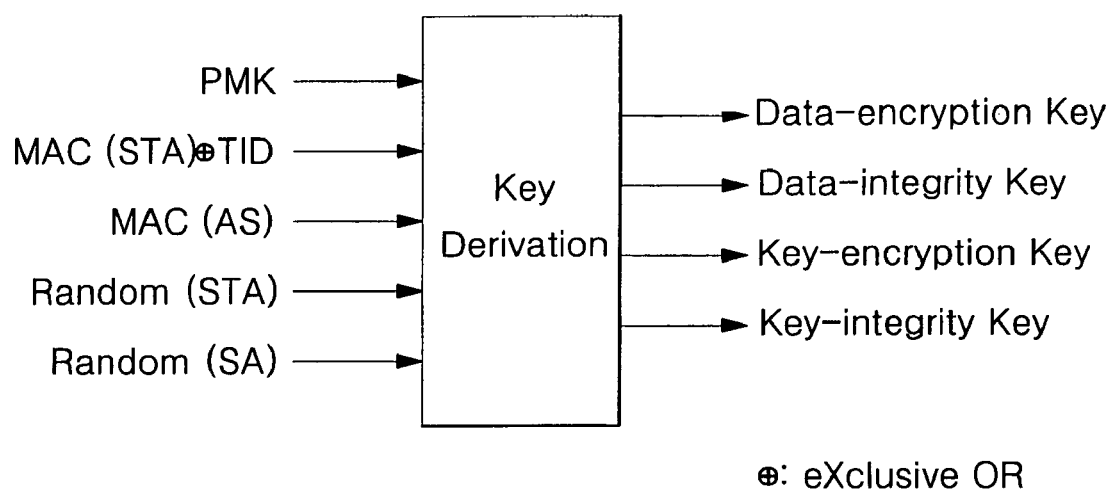
FIG. 7 is an exemplary diagram illustrating a key derivation method according to a further exemplary embodiment of the principles of the present invention.

FIG. 7 is an exemplary diagram illustrating a key derivation method according to a further another exemplary embodiment of the principles of the present invention.

To use the interworking method described above, a Relay Station (RS) 200 manages authentication information on a plurality of Wireless Local Area Network (WLAN) terminals 100 managed by Relay Station (RS) 200. Also, Relay Station (RS) 200 has to manage even a shared key that is shared by Wireless Local Area Network (WLAN) terminal 100 and a Wireless Broadband (WiBro) Access Control Router (ACR) 400. For this, Relay Station (RS) 200 uses a value of XOR operation between a Media Access Control (MAC) address that is information on Wireless Local Area Network (WLAN) terminal 100 and a notified Transport IDentifier (TID) of Relay Station (RS) 200.

In the key derivation method of FIG. 7, when there are inputs of Primary Master Key (PMK), Media Access Control (MAC) address of a terminal (MAC (STA)) XOR Transport IDentifier (TID), Media Access Control (MAC) address of an Authentication Server (MAC (AS)), a Random number generated in a terminal (Random (STA)), and a Random number generated in the Authentication Server (Random (AS)), results such as a data-encryption key, a data-integrity key, a key-encryption key, and a key-integrity key, are obtained.

Primary Master Key (PMK), is a key value previously shared by Wireless Local Area Network (WLAN) terminal 100 and an Authentication Server (AS). "MAC (STA)" signifies a Media Access Control (MAC) address of a terminal.

"Random (STA)" and "Random (AS)" are random numbers generated in the terminal and the AS, respectively.

A key derivation module of Relay Station (RS) 200 can obtain information such as Primary Master Key (PMK), Media Access Control (MAC) address of an Authentication Server (MAC (AS)), a Random number generated in a terminal (Random (STA)), and a Random number generated in the Authentication Server (Random (AS)) during the relay between Wireless Local Area Network (WLAN) terminal 100 and Wireless Broadband (WiBro) Access Control Router (ACR) 400. But Relay Station (RS) 200 does not obtain a key by inputting a Media Access Control (MAC) address of Wireless Local Area Network (WLAN) terminal 100 to the key derivation module as it is, but creates a key based on a result of XOR operation between the Media Access Control (MAC) address and a Transport IDentifier (TID) value. This is to show connectivity with a relay system.

The then obtained key is described as follows. The data-encryption key is a key used for encrypting information forwarded between a terminal and a system. The data-integrity key is a key for verifying integrity that there is not a modification caused by an attacker forwarded between the terminal and the system.

The key-encryption key is a key used for, when creating a data-encryption key or a session key at one side and forwarding the key to the other side, encrypting and forwarding the key. The key-integrity key is a key for verifying integrity that a key encrypted and forwarded is not modified by an attacker.

As described above, the present invention provides a user-oriented Internet connectivity to a user by using an unlicensed bandwidth under a Wireless Broadband (WiBro), Worldwide Interoperability for Microwave Access (WiMAX)-based Broadband Wireless Access (BWA) environment, thereby enabling a management such as Quality of Service (QoS), traffic control, and billing for even the user using the unlicensed bandwidth.

While the present invention has been shown and described in connection with the preferred embodiments, it will be apparent to those skilled in the art that modifications and variations can be made without departing from the spirit and scope of the invention as defined by the appended claims.

What is claimed is:

1. A method for interworking with a Broadband Wireless Access (BWA) network in a Wireless Local Area Network (WLAN) terminal, the method comprising:
   connecting, by a relay station, a Wireless Local Area Network (WLAN) terminal to a Broadband Wireless Access (BWA) network using an initialization process;
   performing, by the relay station, a user authentication process with the Wireless Local Area Network (WLAN) terminal in compliance with a Wireless Local Area Network (WLAN) protocol;
   performing, by the relay station, a user authentication process with a Broadband Wireless Access (BWA) network Access Control Router (ACR) in compliance with a Broadband Wireless Access (BWA) network protocol;
   sending, by the Wireless Local Area Network (WLAN) terminal, an Internet Protocol (IP) address allocation request to the relay station and relaying, by the relay station, the Internet Protocol (IP) address allocation request to a Broadband Wireless Access (BWA) network Radio Access Station (RAS);
   sending, by the Broadband Wireless Access (BWA) network Radio Access Station (RAS), a notification of a Connection IDentification (CID) corresponding to a Quality of Service (QoS) level of the Wireless Local Area Network (WLAN) terminal and an Internet Protocol (IP) address allocated to the Wireless Local Area Network (WLAN) terminal, to the relay station; and mapping and storing, by the relay station, the Connection IDentification (CID) and the Internet Protocol (IP) address of the Wireless Local Area Network (WLAN) terminal, and forwarding the Connection IDentification (CID) to the Wireless Local Area Network (WLAN) terminal, wherein performing, by the relay station, the user authentication process with the Broadband Wireless Access (BWA) network Access Control Router (ACR) comprises receiving a public key created using a Media Access Control (MAC) address of the Wireless Local Area Network (WLAN) terminal and relaying the public key to the Wireless Local Area Network (WLAN) terminal after the Broadband Wireless Access (BWA) network Access Control Router (ACR) performs the user authentication process.

2. The method according to claim 1, wherein performing, by the relay station, the user authentication process in compliance with the Wireless Local Area Network (WLAN) protocol comprises:

receiving an association message comprising the Media Access Control (MAC) address from the Wireless Local Area Network (WLAN) terminal; and performing an IEEE 802.11i user authentication in compliance with the Wireless Local Area Network (WLAN) protocol, using the association message.

3. The method according to claim 2, wherein performing, by the relay station, the user authentication process with the Broadband Wireless Access (BWA) network Access Control Router (ACR) further comprises:

sending a Wireless Local Area Network (WLAN) address of the Wireless Local Area Network (WLAN) terminal comprised in the association message to the Broadband Wireless Access (BWA) network Access Control Router (ACR).

4. The method according to claim 3, further comprising the relay station sending a result of an exclusive OR operation between the Media Access Control (MAC) address of the Wireless Local Area Network (WLAN) terminal comprised in the association message and a Transport IDentifier (TID) to the Broadband Wireless Access (BWA) network Access Control Router (ACR).

5. The method according to claim 4, further comprising the relay station generating a key to be shared by the Broadband Wireless Access (BWA) network Access Control Router (ACR) and the Wireless Local Area Network (WLAN) terminal by using the result of the exclusive OR operation, a Primary Master Key (PMK), a Media Access Control (MAC) address of an authentication server, and a random number.

6. A relay station interworking between a Broadband Wireless Access (BWA) network and a Wireless Local Area Network (WLAN) network, the relay station comprising:

a Broadband Wireless Access (BWA) connection manager to communicate with a Broadband Wireless Access (BWA) network and to perform a Broadband Wireless Access (BWA) network initialization process;

an Unlicensed Mobile Access (UMA) connection manager to communicate with a Wireless Local Area Network (WLAN) terminal and to perform a user authentication of the Wireless Local Area Network (WLAN) terminal connected in compliance with a Wireless Local Area Network (WLAN) protocol; and a Broadband Wireless Access (BWA)-Unlicensed Mobile Access (UMA) setup manager to communicate with the Broadband Wireless Access (BWA) connection manager and the Unlicensed Mobile Access (UMA) connection manager, and to send a request for authenticating the Wireless Local Area Network (WLAN) terminal to the Broadband Wireless Access (BWA) network, wherein the BWA Connection manager relays a public key created using a Media Access Control (MAC) address of the Wireless Local Area Network (WLAN) terminal, to the Wireless Local Area Network (WLAN) terminal, and wherein the Broadband Wireless Access (BWA)-Unlicensed Mobile Access (UMA) setup manager sends an access request message to the Broadband Wireless Access (BWA) connection manager, the access request message comprising a result of an exclusive OR operation between a Media Access Control (MAC) address of the Wireless Local Area Network (WLAN) terminal comprised in an association message and a Transport IDentifier (TID).

7. The relay station according to claim 6, wherein the Unlicensed Mobile Access (UMA) connection manager receives the association message comprising the Media Access Control (MAC) address from the Wireless Local Area Network (WLAN) terminal, and performs an IEEE 802.11i user authentication in compliance with the Wireless Local Area Network (WLAN) protocol using the association message.

8. The relay station according to claim 7, wherein the Broadband Wireless Access (BWA)-Unlicensed Mobile Access (UMA) setup manager forwards the access request message, which comprises the Media Access Control (MAC) address of the Wireless Local Area Network (WLAN) terminal comprised in the association message, to the Broadband Wireless Access (BWA) connection manager.

9. The relay station according to claim 8, wherein, after receiving the access request message from the Broadband Wireless Access (BWA)-Unlicensed Mobile Access (UMA) setup manager, the Broadband Wireless Access (BWA) connection manager performs a user authentication process with the Broadband Wireless Access (BWA) network, and relays the public key.

10. A Universal Mobile Telecommunication System-Wireless Local Area Network (UMTS-WLAN) interworking network, comprising:

a Wireless Local Area Network (WLAN) terminal to provide a data service using at least one of a Wireless Local Area Network (WLAN) network and a Broadband Wireless Access (BWA) network;

a relay station to perform a user authentication with the Wireless Local Area Network (WLAN) terminal in compliance with a Wireless Local Area Network (WLAN) protocol and to perform a user authentication with a Broadband Wireless Access (BWA) network Access Control Router (ACR) in compliance with a Broadband Wireless Access (BWA) network protocol;

a Broadband Wireless Access (BWA) network Radio Access Station (RAS) to allocate, if a connection request of the Wireless Local Area Network (WLAN) terminal is received and in response to a request by the relay station, a dedicated Connection IDentification (CID) number for the Wireless Local Area Network (WLAN) terminal, and to forward data from the Broadband Wireless Access (BWA) network to the Wireless Local Area Network (WLAN) terminal; and a Broadband Wireless Access (BWA) network Access Control Router (ACR) to allocate a public IP address for the relay station in response to a request by the relay station during execution of a Broadband Wireless Access (BWA) network initialization, and to perform a user authentication of the Wireless Local Area Network (WLAN) terminal in response to an authentication request, wherein the Broadband Wireless Access (BWA) network Access Control Router (ACR) creates a public key using a Media Access Control (MAC) address of the Wireless Local Area Network (WLAN) terminal and forwards the created public key to the relay station, and wherein the relay station transmits a result of an exclusive OR operation between the Media Access Control (MAC) address of the Wireless Local Area Network (WLAN) terminal comprised in an association message and a Transport IDentifier (TID) to the Broadband Wireless Access (BWA) network Access Control Router (ACR).

11. The interworking network according to claim 10, wherein the relay station receives the association message comprising the Media Access Control (MAC) address from the Wireless Local Area Network (WLAN) terminal, and performs an IEEE 802.11i user authentication in compliance with the Wireless Local Area Network (WLAN) protocol using the association message.

12. The interworking network according to claim 11, wherein the relay station transmits the Media Access Control (MAC) address of the Wireless Local Area Network (WLAN) terminal comprised in the association message to the Broadband Wireless Access (BWA) network Access Control Router (ACR), and after performing the user authentication of the Wireless Local Area Network (WLAN) terminal.

* * * * *